United States Patent [19]

Mizutani et al.

[11] Patent Number: 4,472,447

[45] Date of Patent: Sep. 18, 1984

[54] MIXED SEASONING ON BASIS OF MONOSODIUM GLUTAMATE

[75] Inventors: Tadashi Mizutani, Yokohama; Hideko Furukawa, Tokyo, both of Japan

[73] Assignee: Ajinomoto Co., Inc., Tokyo, Japan

[21] Appl. No.: 390,897

[22] Filed: Jun. 22, 1982

[51] Int. Cl.$^3$ ............................................. A23L 1/229
[52] U.S. Cl. ..................................... 426/537; 426/650
[58] Field of Search ................................ 426/650, 537

[56] References Cited

U.S. PATENT DOCUMENTS 3,326,697 6/1967 Shimazono et al. ................. 426/537
4,258,072 3/1981 Eguchi et al. .................. 426/650 X

OTHER PUBLICATIONS

Kyowa Fermentation Industry Co. Ltd., Chemical Abstracts, 66:18163c, (p. 1736), (1967).

Primary Examiner—Joseph M. Golian
Attorney, Agent, or Firm—Oblon, Fisher, Spivak, McClelland & Maier

[57] ABSTRACT

A mixed seasoning consisting of 100 parts by weight of monosodium glutamate, 0.05 to 25 parts by weight of a flavor inducing 5' nucleotide, and 0.5 to 10.0 parts by weight of at least one alkali salt of an organic acid selected from the group consisting of sodium fumarate, sodium citrate, sodium or calcium lactate, sodium maleate, sodium tartrate and sodium ascorbate is disclosed.

3 Claims, No Drawings

MIXED SEASONING ON BASIS OF MONOSODIUM GLUTAMATE

The present invention relates to a mixed or combination seasoning as a flavoring agent. More particularly, the present invention is concerned with a mixed seasoning, the taste of which is almost the same in quality as monosodium L-glutamate, and the strength of taste of which is about two to eight times that of monosodium L-glutamate when used in combination with table salt.

It is well known that the combination of monosodium L-glutamate (MSG) and a flavor inducing 5'-nucleotide, such as disodium inosine-5'-monophosphate (IMP), disodium guanosine-5'-monophosphate (GMP), or mixtures thereof, exhibits a synergistic flavoring activity. Moreover, mixtures comprising MSG and a flavor indlucing 5'-nucleotide have been widely used for a long time as economical flavoring agents or seasoning agents for various foods and beverages. However, the conventional mixed seasoning agents are not necessarily satisfactory for all kinds of food and beverages. For example, when many conventional mixed seasonings are used to season Chinese dishes, especially Chinese soup, Occidental dishes, and spice mixes, satisfactory results may not be obtained in comparison to the results achieved with the use of MSG alone.

It is generally known that there is some difference in the quality of taste between conventional mixed seasoning agents and MSG, and that while conventional mixed seasoning agents posses the same delicious taste as MSG, they impart a sweet taste to the foodstuff being flavored. This sweetness is undesirable when the conventional seasoning agents are used in Chinese dishes or soup, Occidental dishes, or spice mixes. This undesirable sweet taste becomes stronger when the concentration of the seasoning agents in Chinese dishes or soup, Occidental dishes, or spice mixes is increased, or the proportion of the flavoring 5'-nucleotide component in the mixed seasoning becomes higher. Therefore there is a continuous need for a mixed seasoning agent which enhances the flavoring characteristics of MSG, but which does not give rise to other undesirable tastes.

SUMMARY OF THE INVENTION

Accordingly, one object of the present invention is to provide a mixed seasoning agent which enhances the desirable flavoring characteristics of monosodium glutamate.

Another object of the present invention is to provide a mixed seasoning agent for various foods and beverages.

Briefly, this object and other objects of the present invention as hereinafter will become more readily apparent can be attained by a mixed seasoning agent which has the same quality as monosodium glutamate when used in various foods and beverages containing 0.4–1.2 g/dl table salt which is the common table salt content of foods and bevarages.

The mixed seasoning agent according to this invention is formed from a combination of 100 parts of MSG, 0.05–25 parts of a flavor inducing 5'-nucleotide and 0.5–10.0 parts of one or more of an alkali salt of an organic acid selected from the group consisting of sodium fumarate, sodium citrate, sodium or calcium lactate, sodium maleate, sodium tartrate, sodium ascorbate and sodium aspartate.

DETAILED DESCRIPTION OF THE PREFERRED EMBODIMENTS

The first ingredient employed in the mixed seasoning agent of the present invention is a known flavoring agent, monosodium glutamate.

The second ingredient employed in the present seasoning agent is a known flavor inducing 5'-nucleotide such as IMP, GMP or sodium ribonucleotide. In the present composition, the second ingredient constitutes from 0.05 to 25 parts by wt., preferably 0.1 to 15 parts by wt. of the composition based upon 100 parts by wt. of the first ingredient (MSG). The factors which determines the quanitity of the second ingredient employed are the strength of tasting power of the mixed seasoning to be prepared and the kind of the second ingredient employed in the seasoning mixture.

In the composition of the present mixed seasoning, as the third component, one or more alkali salts of organic acids selected from the group consisting of sodium fumarate, sodium citrate, sodium or calcium lactate, sodium maleate, sodium tartrate, sodium ascorbate and sodium aspartate are employed in combination with the mentioned ingredients. With regard to the salts of organic acids, not only neutral salts, but also acids salts can be used.

In the preparation of the seasoning mixture of the present invention, generally from 0.5 to 10.0 parts by wt., preferably 1.0 to 8.8 parts by wt., of the third ingredient are employed based upon MSG. However, with regard to one member of the group, i.e. sodium aspartate, it should be used in an amount of about 10 times the amount of the other members of the group since its power to restrain undesirable sweetness in the mixed seasoning and to regulate the quality of taste of the mixed seasoning is about one-tenth that of the other members of the group.

Of the members of the group which constitute the third ingredient of the present composition, monosodium fumarate is preferebly used since the quality of the mixed seasoning agent containing monosodium fumarate is better than the quality of seasoning agents containing other members of the third ingredient.

The mixed seasoning agent of the present invention has the same taste quality of MSG and a strong tasting power of about two to eight times that of MSG. In the examples, parts are given in parts by weight.

Having generally described this invention, a further understanding can be obtained by reference to certain specific examples which are provided herein for purposes of illustration only and are not intended to limit the invention.

EXAMPLE 1

A mixed seasoning (A) consisting of 95.2 parts of MSG, 1.1 parts of IMP, 1.1 parts of GMP and 2.6 parts of monosodium fumarate was prepared in the following manner.

Crystals of MSG and other ingredients, each in the form of a fine powder, were homogeneously mixed. Then, 1.0 to 4.0% (by weight) of water was added to the mixed with the combined ingredients and the mixture was dried to give a product of about 100 parts by weight of powdered mixed seasoning (A).

Separately, a soup base to which seasoning (A) was added in order to carry out organoleptic testing of the seasoning was prepared by the following process: A mixture of 500 g chicken bone and 500 g pig bone was added to 8.0 liters of water, and the aqueous mixture was boiled for three hours. The extract was filtered to obtain 6.0 liters of soup base, to which were added 48 g of table salt (the concentration of table salt was about 0.8 g/dl). Seasoning (A) and MSG (control) were organoleptically tested by a panel of 20 members who had been specially trained for this kind of test.

A 0.1 to 0.2 g/dl amount of seasoning (A) was added to the soup base containing 0.8 g/dl table salt and as the control, 0.5 to 1.5 g/dl of MSG was added to another portion of the soup base. Then, the panel test was performed by the triangle test method with the soup base samples. The results obtained are shown in Table 1.

TABLE 1

| Exp. No. | Concentration of Sample | | Panel Members Discriminated | Results |
|---|---|---|---|---|
| | MSG (control) | Seasoning (A) | | |
| 1 | 0.5 g/dl | 0.1 g/dl | 10 | No discrimination between samples |
| 2 | 1.5 g/dl | 0.2 g/dl | 8 | No discrimination between samples |

Table 1 shows that no difference in the quality of taste was discerned by the panel members between seasoning (A) and the control.

As to the tasting power of seasoning (A), it was found that the tasting power of seasoning (A) was about five to eight times that of the control (MSG).

EXAPLE 2

A mixed seasoning (B) consisting of 87.2 parts of MSG, 1.6 parts of GMP, 2.6 parts of monosodium fumarate and 8.6 parts of NaCl was prepared in the same manner described in Example 1 for the preparation of seasoning (A). Separately, a soup base to which seasoning (B) was added in order to carry out the organoleptic testing of the seasoning was prepared by the following process: 3 Kg of whole fowl was added to 7.0 liters of water, and the aqueous mixture was boiled for three hours. The extract was filtered to obtain 3.0 liters of soup base, to which was added 24 g of table salt (the concentration of table salt was about 0.8 g/dl). Seasoning (B) and MSG (control) were organoleptically tested by a panel of 20 members who had been specially trained for this kind of test.

A 0.25 to 0.50 g/dl amount of seasoning (B) was added to the soup base containing 0.8 g/dl table salt and, as the control, 0.5 to 1.5 g/dl of MSG was added to another portion of soup base. Then, the panel test was performed by the triangle test method with the soup base samples. The results obtained are shown in Table 2.

TABLE 2

| Exp. No. | Concentration of Sample | | Panel Members Discriminated | Results |
|---|---|---|---|---|
| | MSG (control) | Seasoning (B) | | |
| 1 | 0.5 g/dl | 0.25 g/dl | 9 | No discrimination between samples |
| 2 | 1.5 g/dl | 0.50 g/dl | 10 | No discrimination between samples |

Table 2 shows that no difference in taste quality was discerned by the panel members between seasoning (B) and the control and that the taste strength of seasoning (B) was about two to three times that of control (MSG).

EXAMPLE 3

Mixed seasonings (C), (D), (E) and (F) were prepared from the ingredients shown in Table 3 in the same manner as described in Example 1 for the preparation of seasoning (A).

TABLE 3

| INGREDIENTS FOR THE MIXED SEASONINGS | |
|---|---|
| SEASONING (C) | |
| MSG | 95.0 parts |
| IMP | 3.7 |
| Monosodium fumarate | 1.3 |
| SEASONING (D) | |
| MSG | 93.1 parts |
| IMP | 1.1 |
| GMP | 1.1 |
| Disodium dl-maleate | 4.7 |
| SEASONING (E) | |
| MSG | 58.4 parts |
| IMP | 1.8 |
| GMP | 1.8 |
| Monosodium L-aspartate | 38.0 |
| SEASONING (F) | |
| MSG | 92.8 parts |
| IMP | 1.1 |
| GMP | 1.1 |
| Calcium lactate | 5.0 |

Seasoning (C), (D), (E) and (F) were subjected to the organoleptic testing in the same manner as described in Example 1 and it was found that the taste strength of all of the seasonings (D), (E) and (F) were five to eight times that of the control (MSG) and that no difference in tasting quality was discerned between these samples and the control.

EXAMPLE 4

Mixed seasonings (G), (H), (I) and (J) were prepared from the ingredients shown in Table 4 in the same manner as described in Example 1 for the preparation of seasoning (A).

TABLE 4

| INGREDIENTS FOR THE MIXED SEASONINGS | |
|---|---|
| SEASONING (G) | |
| MSG | 92.5 parts |
| IMP | 1.1 |
| GMP | 1.1 |
| Trisodium citrate | 5.3 |
| SEASONING (H) | |
| MSG | 96.0 parts |
| IMP | 1.1 |
| GMP | 1.1 |
| Sodium lactate | 1.8 |
| SEASONING (I) | |
| MSG | 94.8 parts |
| IMP | 1.1 |
| GMP | 1.1 |
| Disodium tartrate | 3.0 |
| SEASONING (J) | |
| MSG | 96.8 parts |
| IMP | 1.1 |
| GMP | 1.1 |
| Sodium ascorbate | 1.0 |

Seasonings (G), (H), (I) and (J) were subjected to organoleptic testing in the same manner as described in Example 2 and it was found that the taste strength of all of the seasonings (G), (H), (I) and (J) were two to three times that of the control (MSG) and that no difference in the taste quality was discerned between these samples and the control.

EXAMPLE 5

Seasoning (A) obtained in Example 1 and MSG (control) were organoleptically tested by a panel of 20 members who had been specially trained for this kind of test.

A beef soup base to which seasoning (A) was added in order to conduct organoleptic testing of the seasoning was prepared by the following process: A 2.7 g/dl amount of a mixture of the ingredients shown in Table 5 was added to hot water. A 0.05 to 0.08 g/dl amount of seasoning (A) was added to the dissolved in the soup base, and as the control, a 0.2 to 0.4 g/dl amount of MSG was added to and dissolved in another portion of the soup base. Then, the panel test was performed by the triangle test method with the samples of the soup base.

The results obtained are shown in Table 6.

TABLE 5

| | |
|---|---|
| Powdered hydrolysate of vegetable protein | 44.7 parts |
| Powdered beef extract | 4.4 |
| Powdered yeast extract | 4.4 |
| Beef tallow | 3.3 |
| Table salt | 20.1 |
| Sugar | 13.1 |
| Powdered onion | 7.2 |
| Powdered celery | 1.3 |
| Cayenne pepper | 0.06 |
| Powdered caramel | 1.44 |

TABLE 6

| Concentration of Sample | | Panel members | |
|---|---|---|---|
| MSG (control) | Seasoning (A) | Discriminated | Results |
| 0.2 g/dl | 0.05 g/dl | 9 | No discrimination between samples |
| 0.4 g/dl | 0.08 g/dl | 10 | No discrimination between samples |

Table 6 shows that no difference in taste quality was discerned by the panel members between seasoning (A) and the control (MSG) and that the tasting power of seasoning (A) was about four to five times that of the control.

EXAMPLE 6

A mixed seasoning (K) consisting of 85.9 parts of MSG, 0.4 parts of IMP, 2.3 parts of monosodium fumarate and 11.4 parts of NaCl was prepared in the same manner as described in Example 1 for the preparation of seasoning (A).

Separately, a spice seasoning base to which seasoning (K) was added in order to conduct organoleptic testing of the seasoning was prepared by the following process: A 0.8 g/dl amount of a mixture of the ingredients shown in Table 7 was added to hot water. A 0.05 to 0.20 g/dl amount of seasoning (K) was added to the spice seasoning base, and as the control, a 0.07 to 0.40 g/dl amount of MSG was added to another portion of the spice seasoning base.

Seasoning (K) and the control (MSG) were organoleptically tested by a panel of 20 members who had been specially trained for this kind of test. The panel test was performed by the triangle test method with the spice seasoning base samples. The results are shown in Table 8.

TABLE 7

| | |
|---|---|
| White pepper Coarse | 4 parts |
| Black pepper Coarse | 4 |
| Onion Coarse | 4 |
| Garlic Coarse | 1.6 |
| Paprica Coarse | 2 |
| Powdered laurel | 0.2 |
| Powdered thyme | 0.2 |
| Powdered yeast extract | 3.0 |
| Table salt | 81 |

TABLE 8

| | Concentration of Sample | | Panel Members | |
|---|---|---|---|---|
| Exp. No. | MSG (control) | Seasoning (K) | Discriminated | Results |
| 1 | 0.07 g/dl | 0.05 g/dl | 9 | No discrimination between samples |
| 2 | 0.40 g/dl | 0.20 g/dl | 8 | No discrimination between samples |

Table 8 shows that no difference in taste quality was discerned by the panel members between seasoning (K) and the control (MSG) and that the tasting power of seasoning (K) was 1.5 to 2 times that of the control.

EXAMPLE 7

A mixed seasoning (L) consisting of 87.2 parts of wt. of MSG, 1.6 parts by wt. of GMP, 2.6 parts by wt. of monosodium fumarate and 8.6 parts by wt. of KCl was prepared in the same manner as described in Example 1 for the preparation of seasoning (A).

Separately, a soup base to which Seasoning (L) was added in order to carry out the organoleptic testing of the seasoning was prepared by the same process as described in Example 2. Seasoning (L) and MSG (control) were organoleptically tested by a panel of 20 members who had been specially trained for this kind of test. A 0.25 to 0.50 g/dl amount of Seasoning (L) was added to the soup base containing 0.8 g/dl table salt and, as the control, a 0.5 to 1.5 g/dl of MSG was added to another portion of soup base. Then, the panel test was performed by the triangle method with the soup base samples. The results obtained are shown in Table 9.

TABLE 9

| | Concentration of Sample | | Panel Members | |
|---|---|---|---|---|
| Exp. No. | MSG (control) | Seasoning (L) | Discriminated | Results |
| 1 | 0.5 g/dl | 0.25 g/dl | 9 | No discrimination between samples |
| 2 | 1.5 g/dl | 0.50 g/dl | 10 | No discrimination between samples |

Table 9 shows that no difference in taste quality was discerned by the panel members between Seasoning (L) and the control and the taste strength of Seasoning (L) was about two to three times that of control(MSG).

Having now fully described this invention, it will be apparent to one or ordinary skill in the art that many changes and modifications can be made thereto without departing from the spirit or scope of the invention set forth herein.

What we claim is:

1. A mixed seasoning, consisting of
   (a) 100 parts by wt. of monosodium glutamate;
   (b) 0.05 to 25 parts by wt. of flavor inducing 5'-nucleotide, and
   (c) 0.5 to 10.0 parts by wt. of at least one alkali salt of an organic acid selected from the group consisting of sodium fumarate, sodium citrate, sodium and calcium lactate, sodium malcate, sodium tantrate, and sodium ascorbate.

2. The mixed seasoning claim 1, wherein the amount of ingredient (a) is as specified, the amount of ingredient (b), which is disodium inosine-5'-monophosphate or disodium guanosine-5'-monophosphate or a mixture thereof, ranges from 0.1 to 15 parts by wt. and the amount of ingredient (c) ranges from 1.0 to 8.8, said ingredient (c) begin at least one alkali salt of an organic acid selected from the group consisting of monsodium fumarate, trisodium citrate, sodium or calcium lactate, disodium maleate, disodium tartrate, and sodium ascorbate.

3. The mixed seasoning of claim 1 or 2, wherein said ingredient (c) is monosodium fumarate.

* * * * *